United States Patent [19]
Mücke et al.

[11] Patent Number: 5,629,487
[45] Date of Patent: May 13, 1997

[54] DEFLECTING ROLLER FOR SENSING THE DISTRIBUTION OF STRESS ALONG THE ROLLER

[75] Inventors: Gert Mücke, Hilden; Helmut Thies, Kaarst; Ebernhard Neuschütz, Ratingen, all of Germany

[73] Assignee: Betriebsforschungsinstitut VDEh Institut Für angewandte Forschung GmbH, Dusseldorf, Germany

[21] Appl. No.: 616,490

[22] Filed: Mar. 19, 1996

Related U.S. Application Data

[63] Continuation of Ser. No. 118,736, Sep. 10, 1993, abandoned.

[30] Foreign Application Priority Data

Oct. 30, 1992 [DE] Germany .................. 42 36 657.7

[51] Int. Cl.$^6$ .................................................. G01L 5/04
[52] U.S. Cl. .................. 73/818; 73/829; 73/858; 73/862.391; 73/862.55
[58] Field of Search .................. 73/159, 790, 818, 73/829, 858, 862.391, 862.42, 862.44, 862.453, 862.471, 862.473, 862.49, 862.55

[56] References Cited

U.S. PATENT DOCUMENTS

| | | | |
|---|---|---|---|
| 2,050,106 | 8/1936 | Lorig et al. | 73/818 |
| 4,366,720 | 1/1983 | Berger et al. | 73/862.07 |
| 4,878,385 | 11/1989 | Lloyd | 73/704 |
| 5,285,684 | 2/1994 | Vesugi et al. | 73/159 |

FOREIGN PATENT DOCUMENTS

| | | | |
|---|---|---|---|
| 2944723 | 4/1988 | Germany . | |
| 1647354 | 5/1991 | U.S.S.R. | 73/813 |
| 8910544 | 11/1989 | WIPO | 73/818 |
| 9102231 | 2/1991 | WIPO | 73/159 |

*Primary Examiner*—Richard Chilcot
*Assistant Examiner*—Eric S. McCall
*Attorney, Agent, or Firm*—Jacobson, Price, Holman & Stern, PLLC

[57] ABSTRACT

A deflecting roller for sensing the distribution of stress along the roller while the roller deflects a strip of sheet material, and in particular, a deflecting roller having a plurality of stress sensors disposed around the roller such that the stress sensors sense the radially acting force on the roller, without contributing any interfering forces thereto. The roller has a plurality of measuring locations defined about the circumference of the roller. Each measurement location includes a recess in the roller; a stress-responsive sensor disposed in the recess; and a sensor cover positioned within the recess so as to cover the stress-responsive sensor. The sensor cover has the same cross sectional shape as the recess so that the sensor cover is guided by the wall of the recess for radial movement with respect to the roller. The sensor cover does not rest on a shoulder in the recess. Instead, an inside surface of the sensor cover bears against one end of the stress-responsive sensor, while the outside surface of the sensor cover is convex to match the circumferential shape of the roller. In operation, when the measuring roller acts to deflect a piece of sheet metal, the sensor cover is forced further into the recess by the piece of sheet metal, and as a result, the sensor cover compresses the stress-responsive sensor between the bottom of the recess and the inside surface of the sensor cover.

24 Claims, 8 Drawing Sheets

DEFLECTING ROLLER FOR SENSING THE DISTRIBUTION OF STRESS ALONG THE ROLLER

This is a Continuation of application Ser. No. 08/118,736, filed Sep. 10, 1993 which was abandoned upon the filing hereof.

BACKGROUND OF THE INVENTION

The present invention relates to a deflecting roller for sensing the distribution of stress along the roller while the roller deflects a strip of sheet material, and in particular, an improved deflecting roller having a plurality of stress sensors disposed around the roller such that the stress sensors sense the radially acting force on the roller, without contributing any interfering forces thereto.

Deflecting rollers having means for measuring the distribution of stress along the roller, are known. Such rollers frequently are used to measure stress, and the resulting measurements are then used to control an operating sequence in a final rolling process of a valuable sheet metal product.

As an example, German Patent No. 2,944,723 discloses that, in a hollow roller comprised of rings held together by a plurality of screws, measurement error can be decreased by appropriately flexing the roller. This is achieved by modifying the form of the deflecting roller to comprise a combination of discs having different shapes, and this, in turn, provides better structural adjustments in the sag zones and also provides improved resistance to sagging in the peripheral zones. Although deviations in the transverse strain due to elastic deformation are slight, they nevertheless lead to errors in the measurement of stress distribution. The circular cross sectional shape of the deflecting roller tends to deform to an egg shape or obloid when under stress, with the larger radius being at the locus where the bending force is exerted on the strip of sheet material. Consequently, the peripheral zones of the roller are successively stretched and compressed, in the direction in which the bending force acts, and as a result of this stretching and compressing, force sensors are stressed in such a way that additional forces and moments are transmitted to each sensor via the covers thereof. These forces are typically referred to as "interfering radial forces".

Figure 1A:
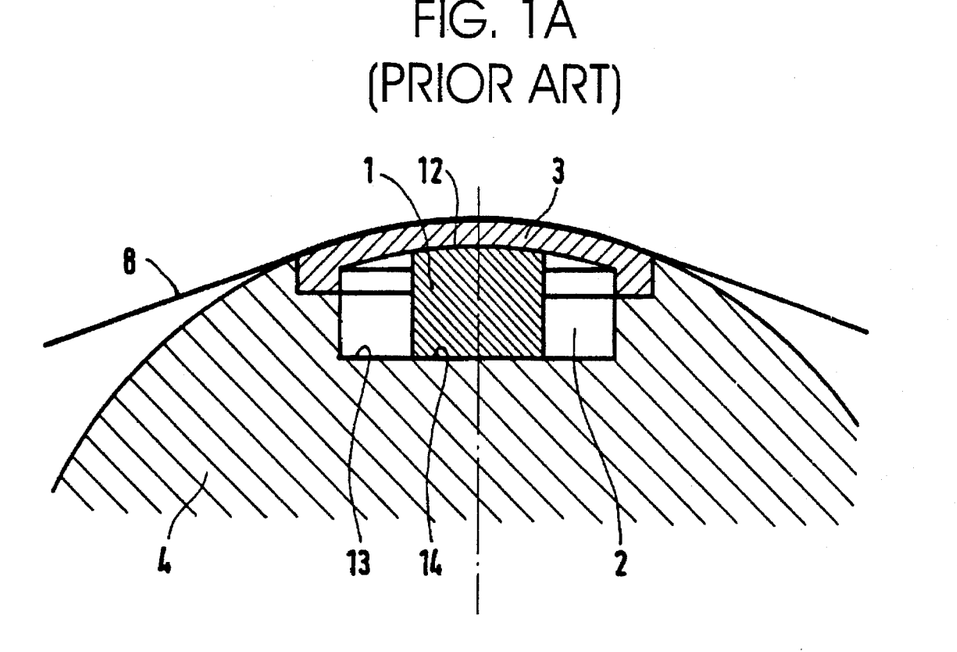
FIGS. 1A and 1B respectively show a cross section and a plan view of a conventional force sensor cover.
Figure 1B:
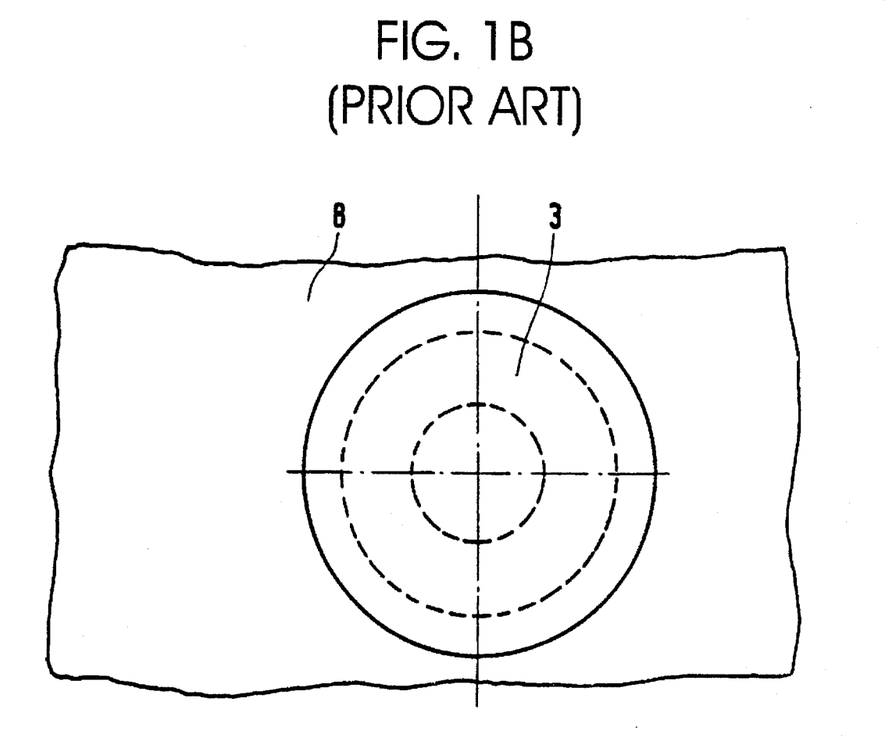
Figure 1C:
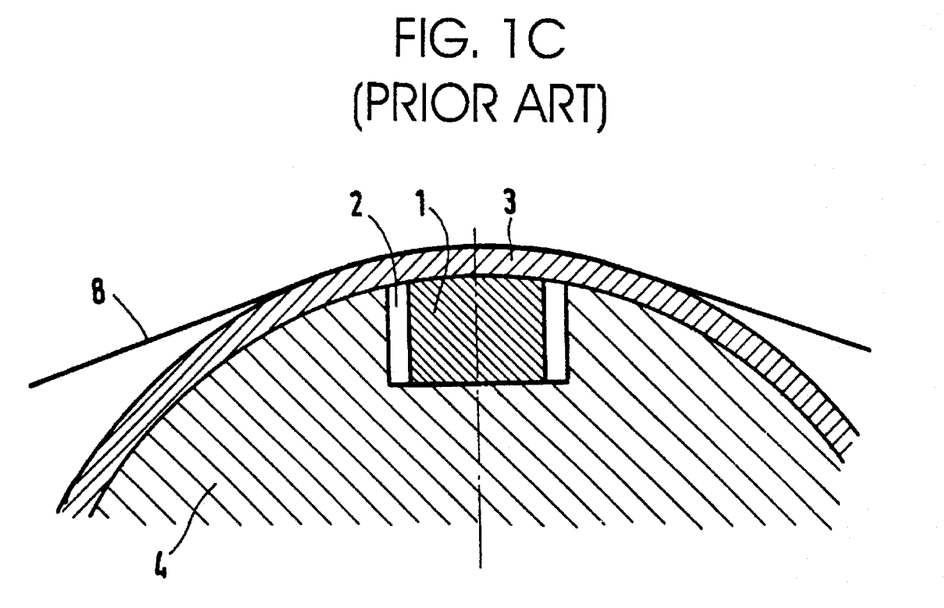
FIG. 1C illustrates a conventional roller wherein restraining of the force sensor is achieved by way of a membrane which is integrally formed with the conventional measuring roller.
Figure 1D:
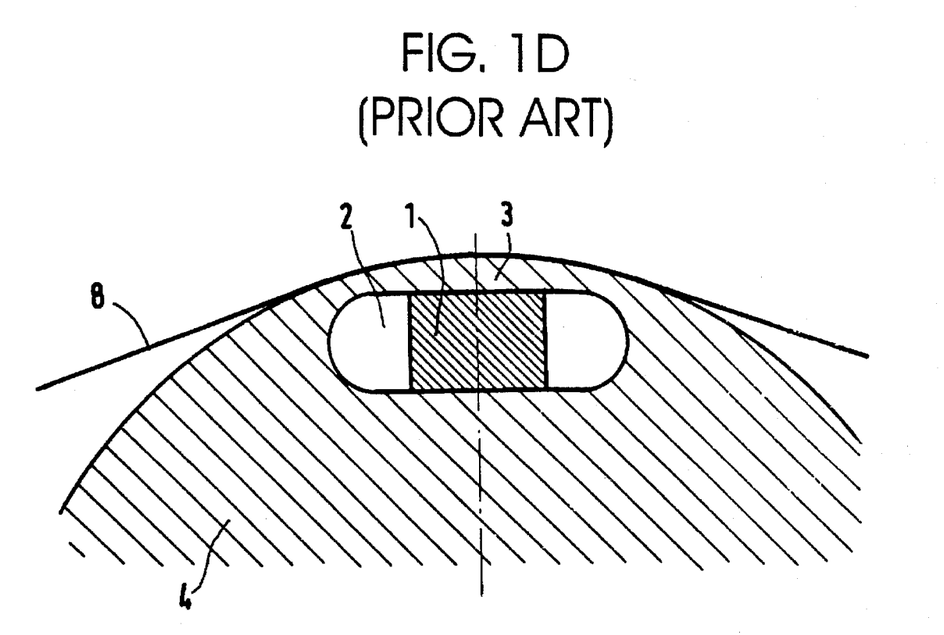
Figure 2:
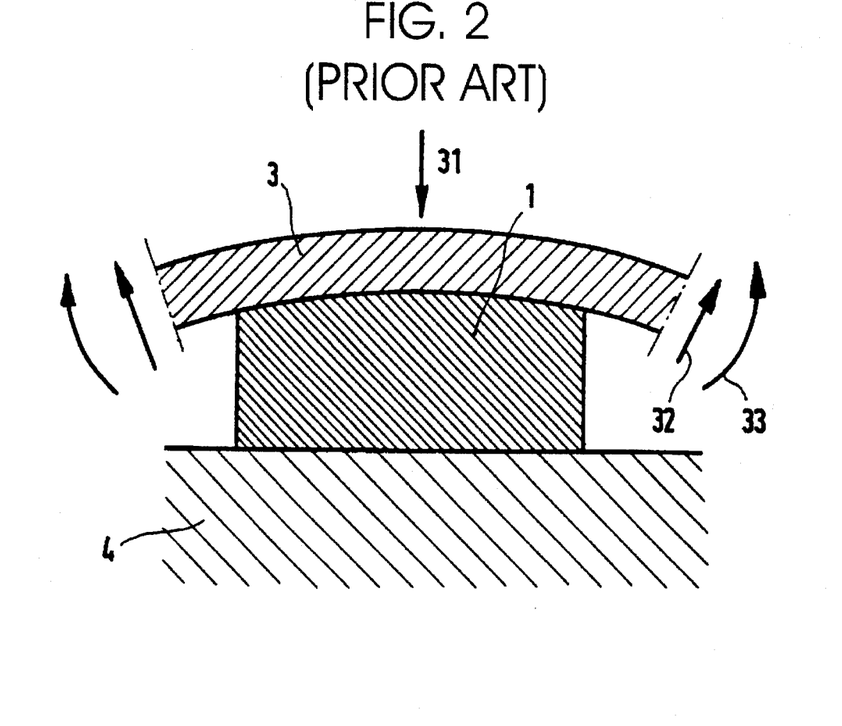
FIG. 2 illustrates forces acting on the force sensor in accordance with the embodiments of FIGS. 1A–1D.

The cover for each force sensor has a major effect on the accuracy of measurements. With reference to FIG. 1D, in the case of a membrane cover 3 integrally formed with the roller 4, effective placement circumferentially around the roller 4 can be obtained by way of contact between the opposite ends of the sensor 1 and the measuring roller 4 itself. FIG. 1C illustrates placement by way of a thermal shrink ring 3, while FIGS. 1A and 1B illustrates a tensile/compressive disc-shaped cover 3. Though the arrangements of FIGS. 1A–1C are generally effective in the radial direction, the covers can become separated from the measurement rollers by gaps. In addition to the forces to be measured, the above-mentioned types of covers therefore transmit forces and moments to the sensor 1 which include interfering radial forces. The arrows in FIG. 2 denote these forces and moments which contribute the interfering radial forces.

The radial forces on each sensor 1 also undergo spurious secondary variations in the event of temperature changes, such as when the roller 4 surface is heated by the sheet material 8. When heating occurs, the roller surface flexes more than the core, resulting in thermal deformation and strain, and thereby generating interfering forces on the cover 3 of the force sensor. Interfering forces of this type are very costly to eliminate, if they can be eliminated at all. One such costly technique is to provide force sensors distributed over the entire circumference of the roller, which sensors have positive and negative characteristic curves and are electrically connected to one another. Likewise, reset circuits can be employed, wherein the interfering signal is set to zero when a certain limit is exceeded.

In addition to deformation of the measuring rollers 4 due to temperature changes, there also may be deformations of the rollers due to flexural (transverse) stresses when the radial forces acting on the rollers 4 are relatively large. Compensating circuits employed in the conventional measuring rollers described above achieve the required compensation by arranging force sensors at the periphery of each roller, at diametrically opposite positions (180 degrees with respect to one another). These diametrically opposed force sensors are interconnected, so that the starting point of the measurement is equal to the bending moment stresses. Such an arrangement, although generally effective, entails substantial investment costs.

SUMMARY OF THE INVENTION

A primary object of the present invention is to overcome the aforementioned shortcomings of the prior art, by reducing or eliminating interfering forces and moments without substantial expenditures in terms of costs and resources, and in particular to do so by modifying the structure of the measuring roller.

To achieve this and other objects, the present invention comprises a measuring and deflecting roller having a plurality of measuring locations defined about the circumference of the roller. Each measurement location includes a recess in the roller; a stress-responsive sensor disposed in the recess; and a sensor cover positioned within the recess so as to cover the stress-responsive sensor. The sensor cover has the same cross sectional shape as the recess so that the sensor cover is guided by the wall of the recess for radial movement with respect to the roller. The sensor cover does not rest on a shoulder in the recess. Instead, an inside surface of the sensor cover bears against one end of the stress-responsive sensor, while the outside surface of the sensor cover is convex to match the circumferential shape of the roller. In operation, when the measuring roller acts to deflect a piece of sheet metal, the sensor cover is forced further into the recess by the piece of sheet metal, and as a result, the sensor cover compresses the stress-responsive sensor between the bottom of the recess and the inside surface of the sensor cover. Because the wall of the recess serves as a guide for radial movement of the sensor cover with respect to the roller, there are no interfering radial forces introduced by the cover and acting on the sensor. Such elimination of the interfering radial forces, allows the present invention to operate more accurately than the conventional measuring rollers which introduce such forces. This, in turn, results in a substantial improvement in the surface quality of the sheet metal product.

While the invention is described with reference to the attached drawings, these drawings are merely illustrative of the present invention and should not be construed as limiting the scope of the invention. It is therefore understood that additional refinements and modifications of the invention, as well as advantageous embodiments, will become readily apparent to those having ordinary skill in the art, without departing from the scope of the invention.

BRIEF DESCRIPTION OF THE DRAWINGS

FIGS. 1A, 1B, 1C, 1D and 2 illustrate conventional measuring rollers, while FIGS. 3–10 illustrate preferred embodiments of the present invention. In particular:

FIG. 1B illustrates a shrunk-on ring for restraining of the force sensor;

DESCRIPTION OF THE PREFERRED EMBODIMENTS

With reference to FIG. 3–10A several preferred embodiments of the present invention will now be described.

Figure 3:
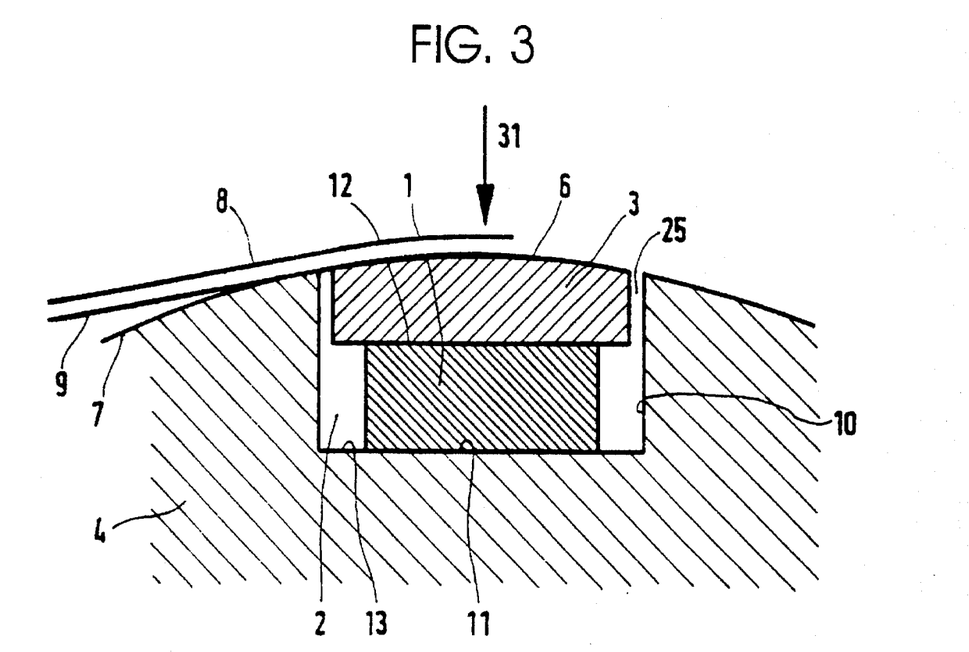
FIG. 3 is a cross section of a measuring roller having a sensor cover in accordance with a preferred embodiment of the present invention.
Figure 4:
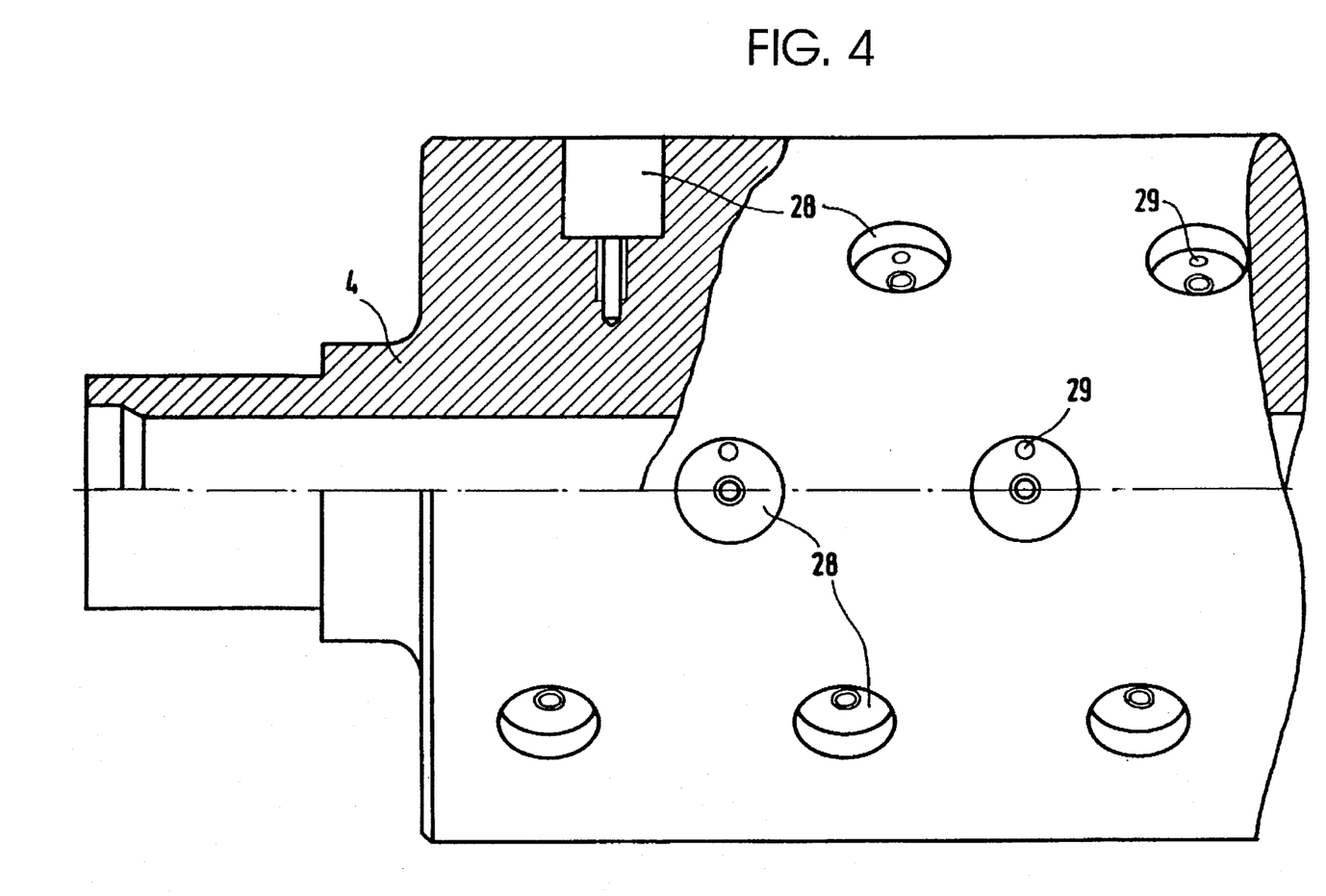
FIG. 4 illustrates the measuring roller of FIG. 3 without the stress-responsive sensor and cover therefor.

With reference to FIG. 3 and 4, a measuring roller 4 for deflecting a piece of sheet material 8 and measuring the stress distribution across the roller 4, is provided with a plurality of measuring locations 28 defined about the circumference of the roller 4. Each measuring location 28 includes a recess 2 in the roller 4; a stress-responsive sensor 1 disposed in the recess 2; and a sensor cover 3 positioned within the recess 2 so as to cover the stress-responsive sensor 1. The sensor cover 3 has the same cross sectional shape as the recess 2 so that the sensor cover 3 is guided by the wall 10 of the recess 2 for radial movement with respect to the roller 4. The sensor cover 3 does not rest on a shoulder in the recess 2. Instead, an inside surface of the sensor cover 3 bears against one end 12 of the stress-responsive sensor 1, while the outside surface of the sensor cover 3 is convex to match the circumferential shape of the roller 4.

In operation, when the measuring roller 4 acts to deflect a piece of sheet metal 8, the sensor cover 3 is forced further into the recess 2 by the piece of sheet metal 8, and as a result, the sensor cover 3 compresses the stress-responsive sensor 1 between the bottom 13 of the recess 2 and the inside surface of the sensor cover 3. Because the wall 10 of the recess 2 serves as a guide for radial movement of the sensor cover 3 with respect to the roller 4, there are no interfering radial forces introduced by the cover 3 and acting on the sensor 1. Such elimination of the interfering radial forces, allows the present invention to operate more accurately than conventional measuring rollers which introduce such forces. This, in turn, results in a substantial improvement in the surface quality of the sheet metal product 8.

Preferably, the sensor 1 comprises a quartz piezo sensor.

As FIG. 3 illustrates, a gap 25 is defined about the circumferential edge of the sensor cover 3, between the sensor cover 3 and the wall 10 of the recess 2. Preferably, the width of this gap 25 is 0.01–0.05 mm. It has been found that under these conditions the inside surface 9 of the metal sheet 8 extending over the measuring roll is not damaged or marked by the roller 4.

This gap 25 therefore should be maintained accurately within the aforementioned range of 0.01–0.05 mm. To this end, in accordance with the present invention, the sensor cover 3 is heated after insertion into the measuring roller recess 2. During heating, the gap 25 closes due to thermal expansion of the sensor cover 3. The appropriate heating temperature has been found to be approximately 100 degrees C. After the sensor cover 3 cools, a uniformly concentric gap 25 develops about the sensor cover 3 with the desired width.

FIG. 4 illustrates a preferred distribution of the individual measuring locations 28. A radially extending bore 29 is formed in each measuring location 28 to accommodate measurement cables, as will be described hereinafter.

Preferably the recesses 2, the sensor covers 3, and the stress-responsive sensors 1 are all shaped cylindrically with a circular cross section. In addition, the sensor covers 3 and the roller 4 are preferably made from the same materials, or materials having the same strength, elasticity, wear resistance, and thermal coefficient of expansion.

Figure 5:
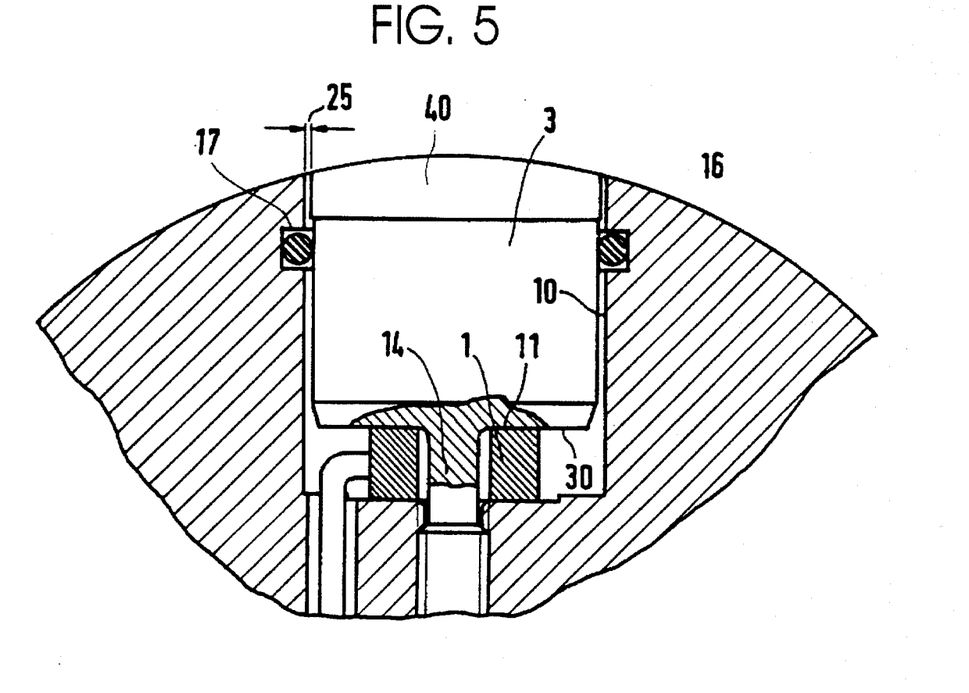
FIG. 5 illustrates a second embodiment of the present invention wherein the sensor covers include shaft members joined to or integrally formed with the sensor covers.

According to the embodiment of FIG. 5, the sensor cover 3 has an inside face 30 disposed against the outward end 12 of the stress-responsive sensor 1. Here, however, the sensor cover 3 has an integrally formed shaft portion 14 which extends radially inward with respect to the roller 4 and through the bottom 13 of the recess 2. The shaft portion 14 then flares out so as to engage a locking mechanism which restricts the radially outward movement of the sensor cover 3.

Though this radially outward movement is restricted, the sensor cover 3 is nevertheless guided by the inner wall 10 of the recess 2 within the range of movement permitted by the locking mechanism. An O-ring 16 is provided between the sensor cover 3 and the inner wall 10 to seal against penetration by foreign matter. Preferably, a groove 17 is also arranged around the circumference of the recess 2 to receive and thereby maintain the position of the O-ring.

Figure 6:
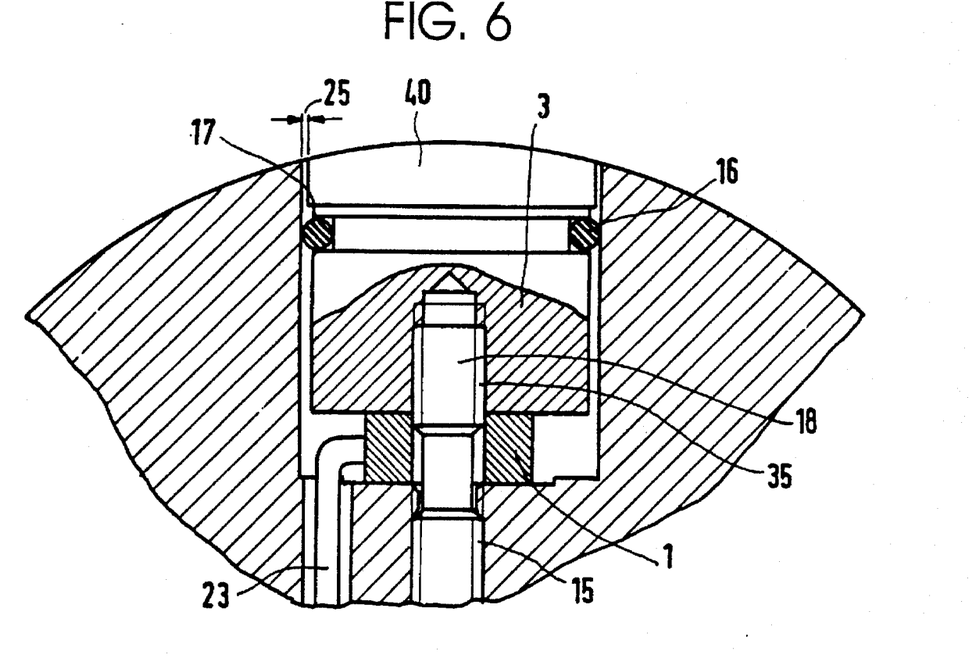
FIG. 6 illustrates a third embodiment of the present invention wherein the sensor covers include internal threads capable of receiving a stay bolt which projects radially outward, for securing the sensor covers to the measuring roller.

The embodiment of FIG. 6 is an alternative arrangement to that of FIG. 5. Here, rather than a shaft portion 14, the sensor cover 3 and the bottom 13 of the recess 2 have a centrally located, threaded bore 15 extending radially out through the bottom 13 of the recess 2, through the inside surface of the sensor cover 3, and partially through the sensor cover 3. Threads 35 in the bore 15 are designed to mate with the external threads of a stay bolt 18 which passes through bore 15 and thereafter engages the sensor cover 3. The head (not shown) of the stay bolt 18 includes a key receiving device (not illustrated) for facilitating turning of the stay bolt 18 for tightening or loosening purposes. Again, it is preferred that a gap 25 be maintained between the sensor cover 3 and the wall 10 of the recess 2, which gap 25 has a width between 0.01–0.05

As FIG. 6 illustrates, the groove 17 which receives the O-ring can be arranged about the circumference of the sensor cover 3, instead of around the recess 2.

Figure 7:
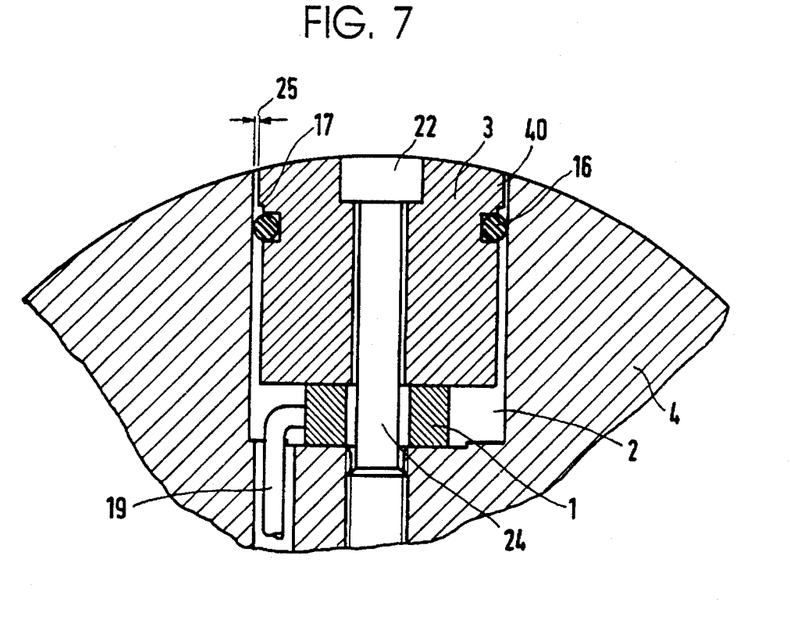
FIG. 7 illustrates a fourth embodiment of the present invention wherein the sensor covers include internal threads capable of receiving a tightening bolt which projects radially inward, for securing the sensor covers to the measuring roller.
Figure 8:
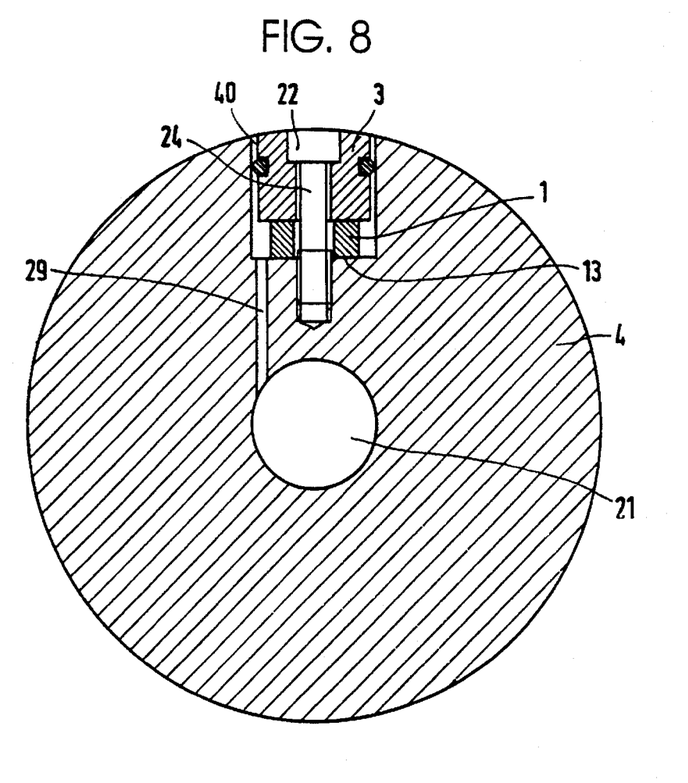
FIG. 8 is a more expansive view of the embodiment illustrated in FIG. 7.

FIGS. 7 and 8 show an alternative embodiment to that of FIG. 6. Here, a tightening bolt 24 having a head 22, passes centrally through the sensor cover 3, through a tubular sensor 1, and through a hole in the bottom 13 of the recess 2. The head 22 of the bolt 24 is received in the sensor cover 3. In addition, an O-ring 16 and a groove 17 in the sensor cover 3 are also provided.

As was the case for the previous embodiments, a locking mechanism restricts the radial movement of the sensor cover 3 with respect to the roller 4. The sensor cover 3 nevertheless is guided within the restricted limits, by the wall 10 of the recess 2.

FIG. 7 further illustrates a measuring cable 19 used to transmit signals generated by the sensor 1. With reference to FIG. 8, the measuring cable 19 passes through the radially extending bore 29 to a longitudinally extending central bore 21 in the roller 4.

Figure 9:
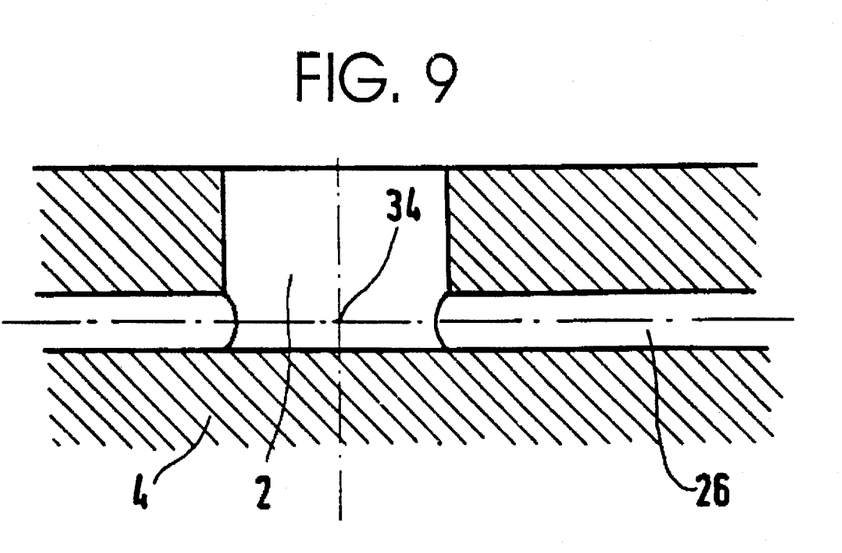
FIGS. 9–9A and 10–10A respectively illustrate centrally located and tangentially located axial cable bores which pass through the roller.
Figure 9A:
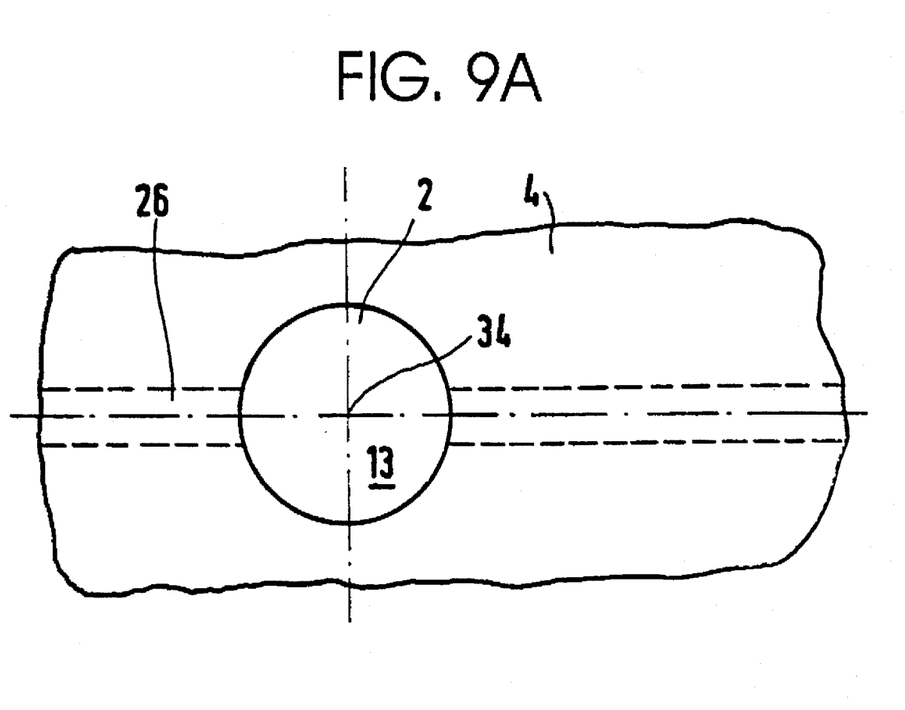
Figure 10:
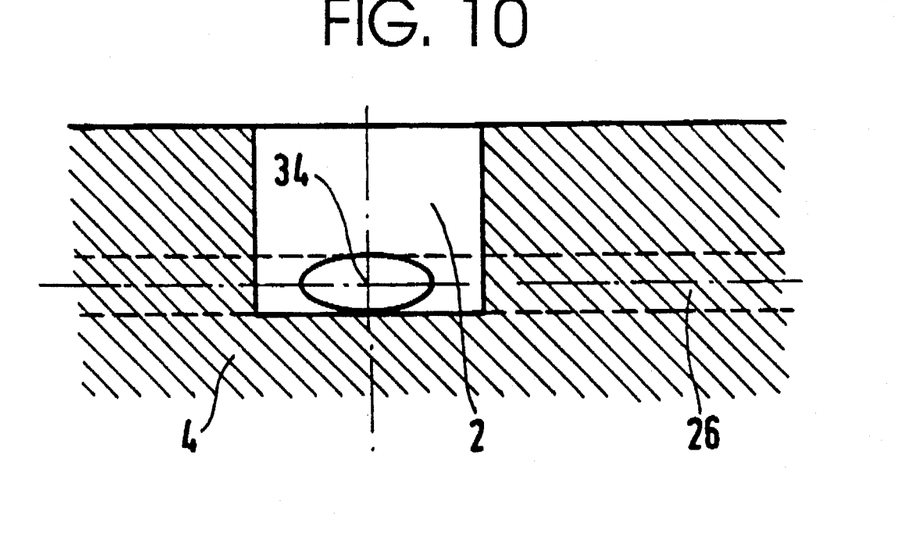
Figure 10A:
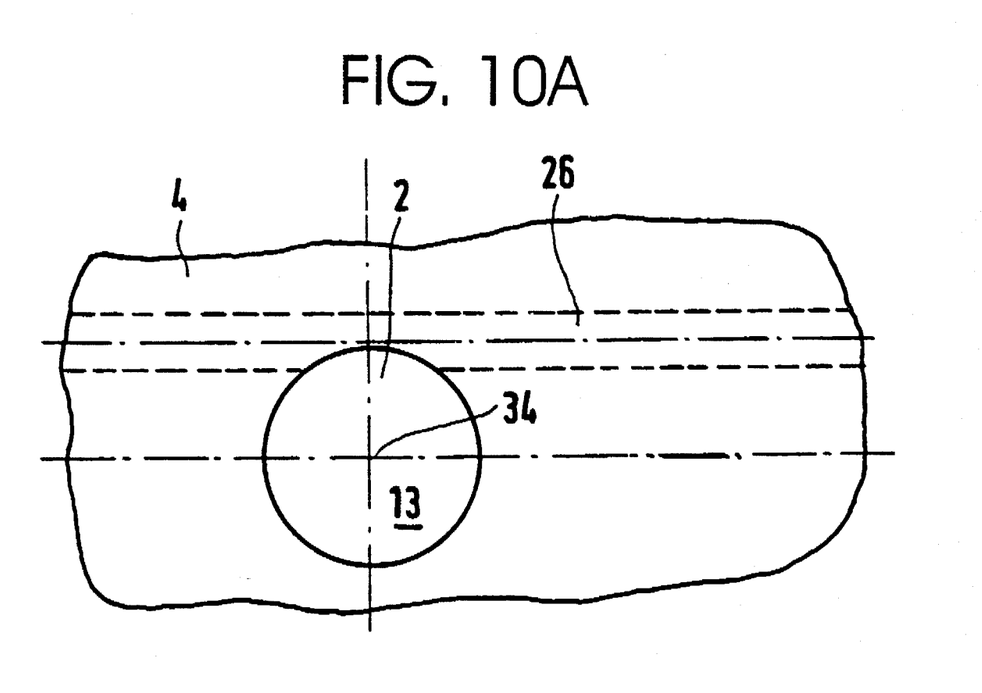

Alternatively, with reference to FIGS. 9, 9A, 10 and 10A, axial bores 26 can extend through the walls 10 of the recesses 2 in order to accommodate a measuring cable 19. In FIGS. 9 and 9A, for example, the axial bores 26 enter and exit at diametrically opposed sides of each recess 2. The axial bores 26 of FIGS. 10 and 10A, by contrast, are arranged tangentially with respect to the wall 10 of each recess 2. It is understood that any combination of these and other bore arrangements can be used to accommodate the measurement cable 19. In fact, a particularly advantageous arrangement may include a combination of radial bores 29 and axial bores 26.

Further, as the embodiments of FIGS. 5–8 illustrate, the sensor covers 3 can include head portions 40 defined by an upper region of increased diameter. These head portions 40 are guided along the wall 10 of the recess 2 with the aforementioned gap 25 defined there between.

Although the present invention has been described with reference to the foregoing embodiments, it is understood that the scope of the invention is not limited to these embodiments, but rather is limited only by the scope of the appended claims.

We claim:

1. An apparatus for sensing distribution of stress along a deflecting roller while said roller deflects a strip of sheet material, including a substantially cylindrical roller body having a circumferential surface, said apparatus comprising:
   a radially extending recess in said cylindrical roller body, having a top portion which opens to the circumferential surface of said cylindrical roller body, a bottom defined at the radially innermost point of the recess, and a side wall defined therebetween;
   a stress-responsive sensor disposed completely within said radially extending recess, the stress-responsive sensor being circumferentially surrounded by the side wall of said recess and spaced apart from said side wall;
   a sensor cover having a cross sectional shape corresponding to that of the radially extending recess, said sensor cover being arranged in the top portion of said recess, for only radial movement with respect to the circumferential surface of the cylindrical roller body, wherein said sensor cover is separated from the side wall of the recess by a gap which circumferentially surrounds the sensor cover and prevents interfering forces from being imparted against the sensor by the sensor cover.

2. The apparatus of claim 1, wherein a convex part of said sensor cover extends outside of said recess in a manner that conforms with the shape of the circumferential surface of said cylindrical roller body.

3. The apparatus of claim 1, wherein said radially extending recess is cylindrical, and said sensor cover has a cylindrical shape that fits within said recess.

4. The apparatus of claim 1, wherein said cylindrical roller body and said sensor cover are comprised of the same material.

5. The apparatus of claim 1, wherein said cylindrical roller body and said sensor cover are comprised of materials with the same strength, elasticity, wear resistance, and thermal coefficient of expansion.

6. The apparatus of claim 1, wherein said cylindrical roller body and said sensor cover are machined together so that a convex part of said sensor cover extends outside of said recess in a manner that conforms exactly with the shape of the circumferential surface of said cylindrical roller body.

7. The apparatus of claim 1, wherein said stress-responsive sensor has a tubular shape.

8. The apparatus of claim 1, and further comprising a groove disposed circumferentially around the sensor cover and an O-ring disposed in said groove, between the sensor cover and the wall of said recess.

9. The apparatus of claim 1, and further comprising a groove disposed circumferentially around the side wall of said recess, and an O-ring disposed in said groove, between the sensor cover and the side wall of said recess.

10. The apparatus of claim 1, wherein said gap is 0.01 to 0.05 millimeters wide.

11. The apparatus of claim 10, wherein said sensor cover responds to being heated to approximately 100 degrees C. by closing said gap, and when subsequently cooled, contracts to redefine said gap in a uniformly concentric manner about the sensor cover.

12. The apparatus of claim 1, wherein said radially extending recess is cylindrical, and said sensor cover has a cylindrical shape that fits within said recess, said sensor cover having a portion of increased diameter disposed at the top of said recess.

13. The apparatus of claim 12, and further comprising a groove disposed adjacent said portion of increased diameter and circumferentially around the side wall of said recess, and an O-ring disposed in said groove between the sensor cover and the side wall of said recess.

14. The apparatus of claim 1, wherein said stress-responsive sensor has a tubular shape, and wherein said sensor cover further comprises a shaft portion extending radially inward with respect to the cylindrical roller body, said shaft portion passing through said stress-responsive sensor, and through the bottom of said recess, and engaging a locking mechanism in the cylindrical roller body, which locking mechanism restricts the radial movement of said sensor cover.

15. The apparatus of claim 1, wherein said stress-responsive sensor has a tubular shape, and further comprising a stay bolt extending radially outward with respect to the cylindrical roller body, said stay bolt extending through the bottom of said recess, through said stress-responsive sensor, and partially through said sensor cover for engagement therewith, said stay bolt also passing through a locking mechanism in the cylindrical roller body, which locking mechanism restricts the radial movement of said sensor cover by restricting the radial movement of the stay bolt.

16. The apparatus of claim 1, wherein said stress-responsive sensor has a tubular shape, and further comprising a tightening bolt disposed centrally through said sensor cover and extending radially inward with respect to said cylindrical roller body, said tightening bolt passing through said sensor cover, through said stress-responsive sensor, and through the bottom of said recess for engagement with a locking mechanism in the cylindrical roller body, which locking mechanism restricts the radial movement of the sensor cover by restricting the radial movement of the tightening bolt.

17. The apparatus of claim 1, and further comprising a measuring cable for transmitting signals generated by said stress-responsive sensor, and a radial bore for accommodating said measuring cable, said radial bore extending through the bottom of the recess and radially inward with respect to the cylindrical roller body.

18. The apparatus of claim 1, wherein said stress-responsive sensor comprises a quartz piezo sensor.

19. The apparatus of claim 1, and further comprising a measuring cable for transmitting signals generated by said stress-responsive sensor, and an axial bore for accommodating said measuring cable, said axial bore extending through the side wall of the recess and axially with respect to the cylindrical roller body.

20. The apparatus of claim 19, wherein a plurality of said measuring cables from a plurality of said stress-responsive sensors, are accommodated within one of the axial bores.

21. The apparatus of claim 20, wherein said plurality of measuring cables branch out from said one of the axial bores at predetermined axial positions where said stress-responsive sensors are located along said cylindrical roller body.

22. The apparatus of claim 1, wherein said radially extending recess is cylindrical, said side wall of the recess having a circumferential groove which partially accommodates an O-ring such that the O-ring is maintained at the groove and projects out therefrom so as to tighten said gap between them side wall of the recess and the sensor cover.

23. The apparatus of claim 1, wherein said radially extending recess is cylindrical, and wherein said sensor cover has a main portion and a portion of increased diameter with respect to the main portion thus defining a shoulder, said portion of increased diameter being circumferentially separated from the side wall of the recess by said gap, said main portion having a circumferential groove which partially accommodates an O-ring such that the O-ring is maintained at the groove and projects out therefrom so as to engage the side wall of said recess.

24. The apparatus of claim 1, wherein said deflecting roller and said sensor cover are constructed from materials having substantially the same strength and properties of thermal expansion.

* * * * *